United States Patent [19]

Funderburg

[11] 4,179,631

[45] Dec. 18, 1979

[54] ELECTROMAGNETIC MOTOR

[76] Inventor: William S. Funderburg, 2103 Pender Ave., Wilmington, N.C. 27892

[21] Appl. No.: 857,772

[22] Filed: Dec. 5, 1977

Related U.S. Application Data

[63] Continuation-in-part of Ser. No. 770,938, Feb. 24, 1977, abandoned.

[51] Int. Cl.$^2$ .............................................. H02K 7/06
[52] U.S. Cl. ........................................ 310/20; 310/32
[58] Field of Search ...................... 310/20, 21, 22, 24, 310/34, 35, 32, 33

[56] References Cited

U.S. PATENT DOCUMENTS

| | | | |
|---|---|---|---|
| 1,198,934 | 9/1916 | Le Grande | 310/22 |
| 1,428,489 | 9/1922 | Mace | 310/35 X |
| 1,703,997 | 3/1929 | Greenwood | 310/32 |
| 3,718,829 | 2/1973 | Wilson | 310/20 X |

FOREIGN PATENT DOCUMENTS 550249 12/1942 United Kingdom ...................... 310/32

*Primary Examiner*—Donovan F. Duggan

[57] ABSTRACT

A pair of spaced, toroidal-shaped, electromagnetic coils are enclosed in a cylindrical housing and when supplied with alternating D.C. current, cause a floating armature to reciprocate therebetween. The armature includes a non-conductive linear output drive rod secured thereto and extending therefrom through the central opening in at least one of the electromagnetic coils to deliver the force generated by the reciprocating armature to a suitable force transmitting mechanism. The armature floats within the cylindrical housing and is so positioned with respect to the electromagnets, that its path of movement is totally between the two opposed electromagnets and never enters the central opening formed therein, whereby frictional losses are eliminated, the strength of the magnetic flux field is maximized, and the magnetic force generated by each electromagnet acts more consistently over the entire armature throughout its path of movement.

1 Claim, 3 Drawing Figures

ELECTROMAGNETIC MOTOR

BACKGROUND OF THE INVENTION

This application is a continuation-in-part of application Ser. No. 770,938 filed Feb. 24, 1977, now abandoned.

With the increased emphasis on the minimizing of air polluting and noise polluting gasoline type engines, there has been a revived interest in the use of electric motors for propelling vehicles and operating other types of equipment that were formerly propelled and operated by gasoline type engines. Vehicle engines powered by electric motors, as such, are not new and there have been electric automobiles, and other vehicles, such as golf carts around for many years. However, most of such approaches use voltage from a battery or other direct current source which directly operates a rotating shaft, resulting in a terrific drain on the batteries with the attendant significant limitation in the range of such vehicles.

One approach which limits the drain on the batteries and increases the range of the vehicle is the use of the batteries to activate one or more solenoids, the iron rod or plunger of which is caused to reciprocate responsive thereto. The reciprocation of the plunger of the solenoid is caused to operate a drive shaft as is illustrated in the Gelnaw U.S. Pat. No. 2,056,719; the Bock U.S. Pat. No. 424,535; and the Moodyman U.S. Pat. No. 1,886,040. While an improvement to the direct approach discussed hereinabove, there are still several disadvantages to the solenoid approach which include: frictional losses between the plunger and the coil as the plunger reciprocates; relatively weak magnetic flux field limits power output; the magnetic attraction acts only over a portion of the entire plunger at any one time; and the pulling and pushing force is relatively inconsistent depending upon the position of the magnetic plunger within the flux field. As a result, such approaches have not been successful for the movement of relatively large vehicles where the application of significant force is required and have been limited to rather small pumps as illustrated in the Morgan U.S. Pat. No. 3,134,938.

SUMMARY OF THE PRESENT INVENTION

The present invention, on the other hand, while using electromagnets to activate an armature back and forth to develop linear energy, overcomes the aforementioned problems in a unique way. First of all, the solenoid is replaced by a pair of spaced, toroidal-shaped electromagnet coils with the armature positioned entirely between the two magnetics and being of such diameter that is greater than the central opening in the electromagnets so that the armature does not reciprocate back and forth within the confines of the electromagnetic coil. The two coils are generally similar to the effect which would be achieved by two lifting electromagnets placed in confronting relationship and alternately energized. The electromagnets and armature are enclosed within a cylinder housing formed of a cylindrical shell having a non-conductive lining and two ends or heads. The heads have a central opening therein and a roller bearing surrounding the opening receives and supports the non-conductive shaft extending outwardly from the armature in either direction. A source of direct current energy is applied to the electromagnets alternately, so that the armature is caused to reciprocate back and forth within the housing causing a resulting movement of the drive rod back and forth. This energy can be transmitted to a drive shaft. Several of such electromagnetic motors may be connected to the drive shaft so that considerable work can be exerted, sufficient to propel the vehicle.

A switching mechanism is electrically connected between the source of direct current (battery) to switch the voltage back and forth between the two coils. Further the reciprocal motion of the armature creates A.C. current within the coils which can be utilized to keep the battery recharged.

It is therefore an object of the present invention to provide an improved electromagnetic motor which maximizes energy output therefrom, yet is quiet and utterly free of air polluting elements.

It is another object of the present invention to provide an improved electromagnetic motor of the type described in which the armature floats within a cylinder housing between two alternately excited electromagnetic coils.

It is another object of the present invention to provide an improved electromagnetic motor in which the arrangement of the electromagnets and armature minimizes or substantially eliminates frictional losses, and acts consistently over the entire armature throughout its path of movement.

Other objects and a fuller understanding of the invention will become apparent from reading the following detailed description of a preferred embodiment in association with the accompanying drawings in which.

DETAILED DESCRIPTION OF A PREFERRED EMBODIMENT

Figure 1:
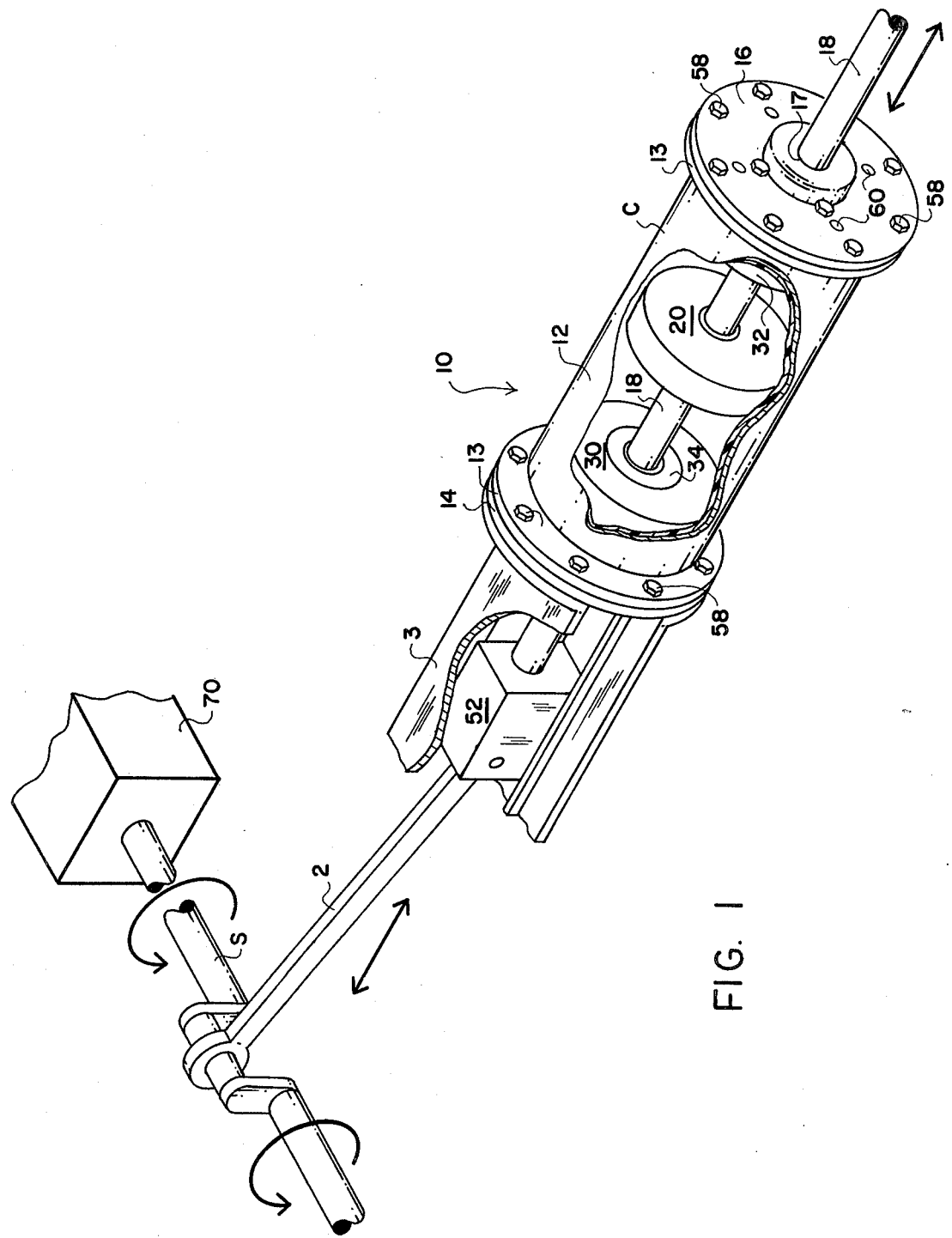
FIG. 1 is a perspective view, with portions broken away, of the electromagnetic motor according to the present invention.
Figure 2:
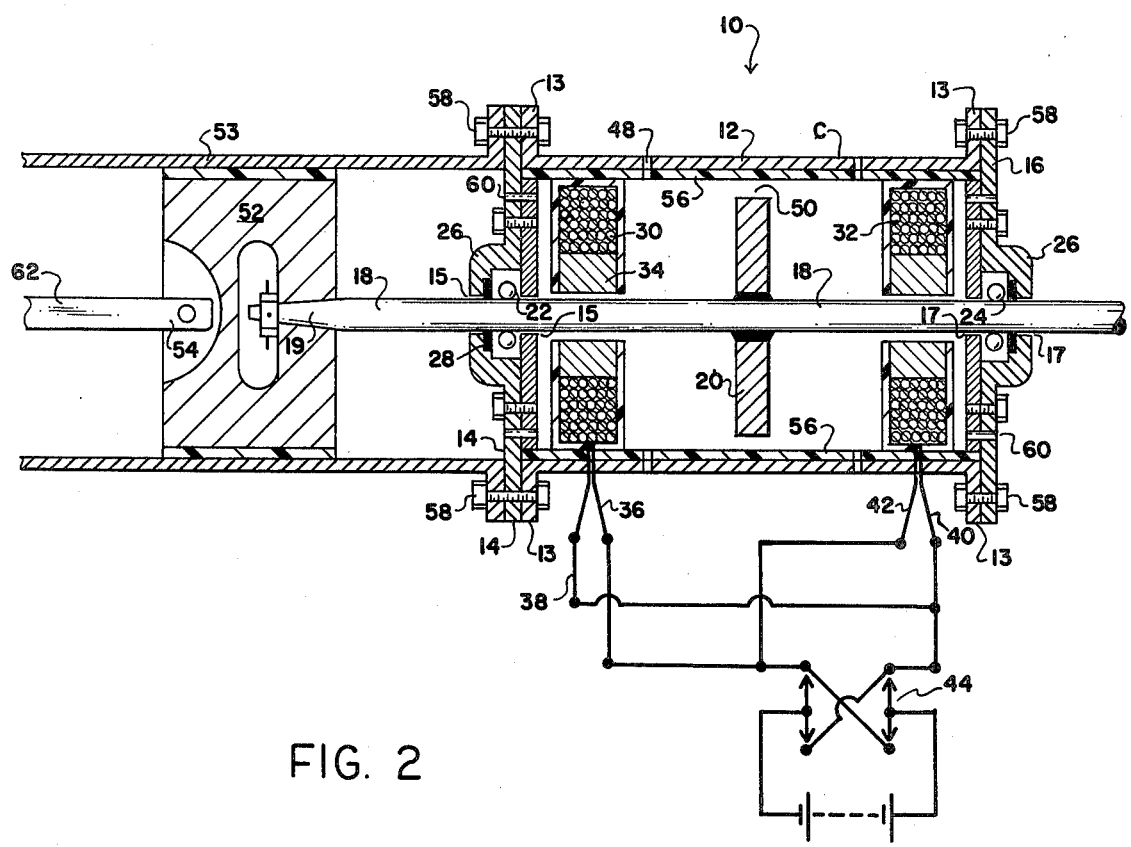
FIG. 2 is a sectional view of the motor illustrated in FIG. 1.

Turning now to the drawings and particlarly first of all to FIGS. 1 and 2, there is illustrated a single electromagnetic motor 10 of the type contemplated by the present invention. It should be apparent that the motor 10 herein illustrated and described can be combined or grouped with other motors to provide additional energy input to a drive shaft or other energy transmitting device.

In general, the electromagnetic motor according to the present invention includes a cylinder housing C including a cylindrical shell 12 enclosed at either end by a front cylinder head 14 and a rear cylinder head 16. At least the front cylinder head 14, and preferably both cylinder heads 14,16 include a central opening 15,17 therein. A reciprocating armature 20 is secured to a non-conducting drive rod 18 (formed of or coated with a non-conducting material) and supported within the cylindrical shell 12 thereby. The drive rod 18 is movably received within the openings 15,17 and provide the means for supporting the armature for reciprocal motion therein as will be described more fully hereinafter. A pair of toroidal shaped, bifilar wound electromagnetic coils 30,32 are stationarily mounted inside the front and rear end of the cylindrical housing C adjacent the front and rear cylinder heads 14,16, and each coil 30,32 includes a central opening therein aligned with the opening 15,17 in the adjacent cylinder head 14,16.

The arrangement and positioning of the electromagnetic coils relative to the armature is such that upon reactivation of the armature 20 its path of movement is between coils 30,32 and does not enter the central opening in either coil.

A source of direct current 46 is alternately connected to the coils 30,32 by means of a switching means 44 so arranged as to cause the direct current to flow first to one coil and then to the other.

The free end of the drive rod 18 is connected to a force transmitting means for delivering the force generated by the motor as described hereinabove to a using mechanism 70. For example, the drive rod 18 may be connected to a rotatable drive shaft by some type of connecting rod 62. Reciprocal motion of the armature 20 will cause a resulting rotation of the drive shaft S as illustrated in FIGS. 1 and 2.

Turning now to the embodiment illustrated in FIGS. 1 and 2 in more detail the cylindrical shell 12 includes a flange 13 at either end thereof, to which the front and rear cylinder heads 14,16 are bolted by means of anchor bolts 58. Each cylinder head 14,16 is provided with a shaft supporting, anti-friction roller bearing 22,24 held within the central openings 15,17 by means of bearing retainers 26, which, in turn, are further provided with dust seals 28 therein which protect the bearings. The bearings 22 provide the sole means of support for the drive rod 18. As illustrated drive rod 18 extends forwardly and rearwardly from either side of the armature, however, with proper bearing design, it might be possible to eliminate the rear portion of the drive rod 18, and merely have the rod 18 extend through the front head. In such a case, the rear head would be a solid plate member.

The cylinder shell 12 is provided with air vents 48 and the diameter of the armature 20 is less than the inner dimension of the shell 12 so that an air space or gap 50 exists between the periphery of the armature 20 and the lining 56 of the shell 12. Lining 56 should be of a non-conductive material. The cylinder heads are further provided with air vents 60 for maintaining a continuous atmospheric pressure inside the cylindrical housings C. Without the air vents, continuous, alternating conditions of positive and negative would occur on either side of the armature as it moved back and forth.

Each of the magnetic coils is formed by a toroidal windings around a core 34. A pair of leads 36,38 connect the poles of the front electromagnet to the switching means 44, and a second pair of leads 40,42 connect the poles of the rear electromagnetic 32 to the switching means 44.

The front or free end 19 of drive rod 18 is mechanically linked to the drive shaft S according to many conventional linkage systems, however, one possible way is to connect the drive rod 18 to a cross-head flasher piston 52 which reciprocates within a pair of guides 53 responsive to the movement of armature 20. A rod flasher 54 is connected to the front end of the flasher piston 52 and so connected to the drive shaft S as to impart a rotary motion thereto responsive to the reciprocal motion of the electromagnetic motor. As mentioned hereinabove, several of the motors 10 may be grouped with the drive rods 18 of each connected to the drive shaft in the same or a similar manner as described hereinabove for increasing the power input to the drive shaft.

Figure 3:
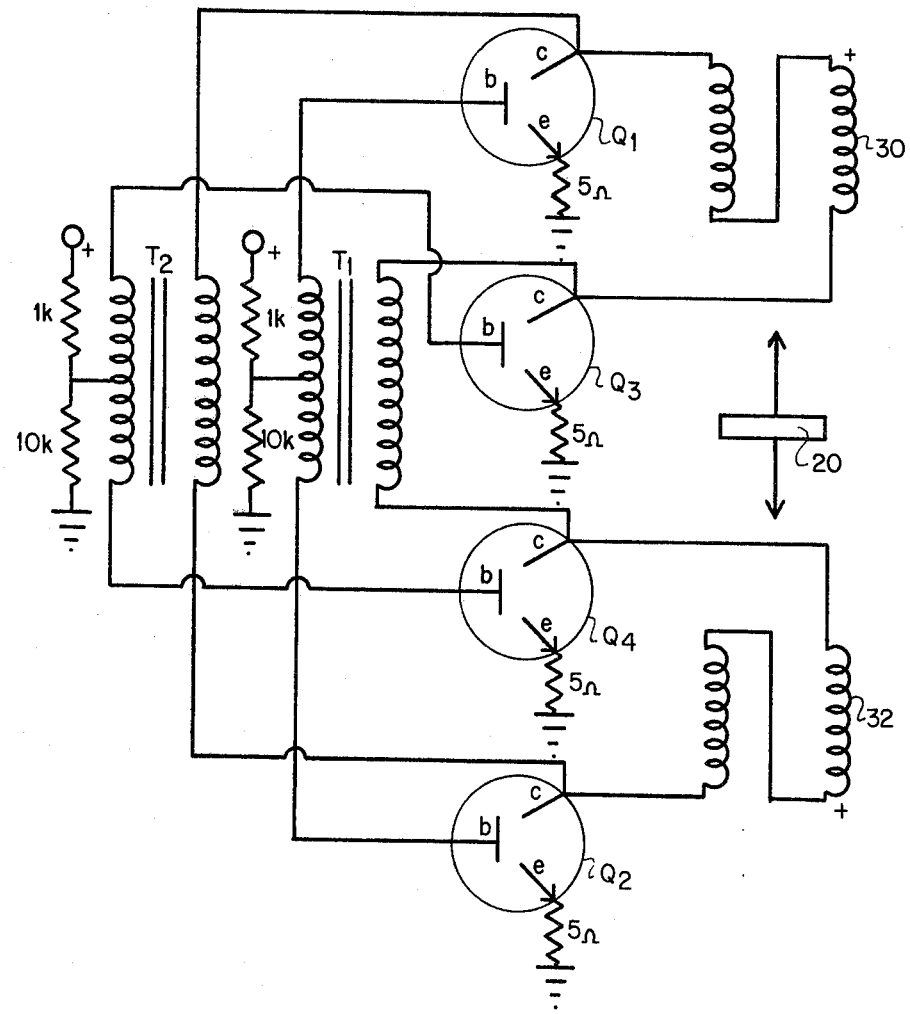
FIG. 3 is a schematic illustration of the electrical circuitry of the switching mechanism which alternates the direct current source from one coil to the other, and further illustrating the recharging circuitry.

The switching of the voltage to each of the electromagnets may be carried out according to any of various well known arrangements, either responsive to the reciprocal movement of the armature 20 as by limit switches or the like (mechanical activation) or by a timed pulse arrangement (electrical activation). One example of a suitable arrangement (the electrical approach) is illustrated in FIG. 3. As there illustrated, a pair of small drive transformers T1,T2 having the primary windings thereof connected to the base of one of four NPN type transistors Q1–Q4, while the secondary windings or impedance sides are connected to the collectors of the transistors, which are also connected to the leads of the electromagnets 30,32, as illustrated in FIG. 3.

When voltage is applied to the positive poles of transformer 11, transistor Q1 is in the conductive state, current is flowing from the emitter to the collector thereof to the top of the electromagnetic coil 30 which attracts the piston. While Q1 is conducting current through the impedance side of transformer T2, a portion of the current is flowing to the collector of Q2 which is not conductive at this time. This will bias the base of Q1 and causes it to turn off, while Q2 is now conducting current from the emitter to the collector, causing the actuation of electromagnetic coil 32. As this coil energizes causing the piston to travel, voltage passes through the collector of Q2 to the primary of transformer T2 back to the collector of Q1 to electromagnetic coil 30 which induces a reverse polarity to transformer T1. This induces a positive signal to transistor Q1 and a negative signal to Q2 (turning it off). Q1 is now back in the conductive state. Transistor Q3 and Q4 operate similarly with transformer T2.

In operation, as the direct current is applied to the switching means 44, the direct current voltage source is alternatingly introduced to the front and rear electromagnetic coils 30,32 causing the piston armature to reciprocate. As it traverses one of the fields, it also traverses partially the other field and is actually being repelled from one of the electromagnetics toward the other as a result of the time lag in the field which occurs when the current is shifted from one magnetic to the other.

The result of the electronic switching circuit causes the armature to reciprocate will develop alternating DC current within the system which can be fed through the alternator and used to recharge the source of direct current much the same as a vehicle battery does by means of the generator and alternator in conventional automobiles.

Although a preferred embodiment of the present invention has been described in detail hereinabove, it is obvious that various changes and modifications might be made without departing from the scope of the invention which is set forth in the following claims.

What is claimed is:

1. An electromagnetic motor comprising:
   (a) a cylinder housing including a cylindrical shell enclosed at the ends thereof by a front and rear cylinder head, at least the front cylinder head having a central opening therein;
   (b) a disc-shaped armature having a drive rod extending therefrom and through said central opening, bearing means in said front cylinder head surrounding said central opening and supporting said drive rod therein, said armature being thereby mounted for reciprocal movement in said cylinder housing, the diameter of said armature being less than the inner diameter of said cylindrical shell so that an air space exists therebetween;

(c) a toroidal shaped, bifilar wound electromagnetic coil mounted inside the front and rear ends of said housing adjacent said front and rear cylinder heads, at least the front end coils having a central opening therein aligned with and corresponding to the opening in said adjacent cylinder head;

(d) the arrangement and positioning of the magnetic coils and the armature being such that, upon activation of said armature, its path of movement is between said coils only and not within the central opening therein;

(e) a source of direct current and a switching means connecting said source of direct current with said magnetic coils in such a manner that said direct current is caused to flow alternatingly to one coil and then to the others; and (f) a force transmitting means connected to the free end of said drive rod for delivering the force generated by said motor to a mechanism.

* * * * *